United States Patent [19]
Shrader et al.

[11] Patent Number: 6,151,599
[45] Date of Patent: Nov. 21, 2000

[54] WEB CLIENT SCRIPTING TEST ARCHITECTURE FOR WEB SERVER-BASED AUTHENTICATION

[75] Inventors: Theodore Jack London Shrader; Michael Bradford Ault; Garry L. Child, all of Austin; Ernst Robert Plassmann, Pflugerville; Bruce Arland Rich, Round Rock; Davis Kent Soper, Cedar Park, all of Tex.

[73] Assignee: International Business Machines Corporation, Armonk, N.Y.

[21] Appl. No.: 09/118,561

[22] Filed: Jul. 17, 1998

[51] Int. Cl.[7] .................................................. G06F 15/173
[52] U.S. Cl. ................................ 707/9; 707/10; 709/203; 709/219; 709/225; 713/201; 713/202
[58] Field of Search .......................... 707/10, 9; 709/203, 709/219, 224, 225, 229; 713/202, 201

[56] References Cited

U.S. PATENT DOCUMENTS

| | | | |
|---|---|---|---|
| 4,937,827 | 6/1990 | Beck et al. | 371/23 |
| 5,353,243 | 10/1994 | Read et al. | 364/578 |
| 5,565,316 | 10/1996 | Kershaw et al. | 434/322 |
| 5,813,022 | 9/1998 | Ramsey et al. | 711/3 |
| 5,875,296 | 2/1999 | Shi et al. | 395/188.01 |
| 5,878,417 | 3/1999 | Baldwin et al. | 707/10 |
| 5,968,125 | 10/1999 | Garrick et al. | 709/224 |
| 6,014,651 | 1/2000 | Crawford | 705/400 |
| 6,026,440 | 2/2000 | Shrader et al. | 709/224 |

*Primary Examiner*—Jean R. Homere
*Attorney, Agent, or Firm*—Jeffrey S. LaBaw; Felsman, Bradley, Vaden, Gunter & Dillon, LLP

[57] ABSTRACT

A test page including a statement invoking an executable periodically reloading the test page is placed on a Web server having a security plug-in to be tested. The test page may include multiple frames, each containing a reference requesting access to the same test page or each performing a different testing function. The test page may be placed in a protected directory, may include an attempt to access the contents of a file within a different protected directory, and may include attempts to access protected CGI executables or other programs or modules which may be run on the Web server. A remote browser is employed to attempt to access the test page using the userid and password employed to login to the browser. Successful or unsuccessful access to the test page verifies proper operation of the security plug-in. The test page is automatically reloaded by the browser at a selected interval, and multiple frames or multiple browser instances each accessing the test page results in stress testing of the security plug-in.

20 Claims, 4 Drawing Sheets

202

This is a reload testing page for DFS Web Secure.
Thu Jun 11 15:02:18 CDT 1998
http://pawnee:36666/:/jstest.html

Figure 2

WEB CLIENT SCRIPTING TEST ARCHITECTURE FOR WEB SERVER-BASED AUTHENTICATION

BACKGROUND OF THE INVENTION

1. Technical Field

The present invention relates in general to testing of distributed computing environment security and in particular to security authentication testing for World Wide Web-based server applications. Still more particularly, the present invention relates to a test architecture for efficient testing of security authentication or authorization plug-ins for Web-based server applications.

2. Description of the Related Art

Most World Wide Web (typically referred to as "WWW" or often simply "the Web") have an authentication mechanism allowing Web site administrators to create authorized users and/or groups, and to define which local directories are accessible to those users and groups. However, designers and developers wishing to add their own authentication products to a Web server generally must implement their products as plug-ins, Java servlets, or the like to the authentication or service step of the Web server. For example, the Distributed File System (DFS) Web Secure product utilizes a plug-in to allow users to login with their Distributed Computing Environment (DCE) userid through a Web browser, then retrieve documents in DFS and run Common Gateway Interface (CGI) executables with DCE credentials through the Web server.

Commercially available programs for testing Web server-based authentication are not believed to presently exist. Such testing is apparently approached on an ad-hoc basis by entities implementing a security authentication plug-in, without a systematic testing program being available for testing various aspects of the resulting security and/or stress testing of the server. It would be preferable for the testing environment to be compatible with a Web browser, but the testing needs may be satisfied by a generalized testing architecture which can work with any environment supporting a client-side scripting language such as JavaScript.

It would be desirable, therefore, to provide an authentication testing product compatible with the SSL protocol and which may be run automatically through a Web browser. It would further be advantageous for the testing product to simultaneously test the documents and CGIs or any other program run on a Web server which are loaded during testing of an authentication plug-in.

SUMMARY OF THE INVENTION

It is therefore one object of the present invention to provide an improved method and apparatus for testing of distributed computing environment security.

It is another object of the present invention to provide an improved method and apparatus for security authentication and authorization testing for World Wide Web-based server applications.

It is yet another object of the present invention to provide a test architecture for efficient testing of security plug-ins or equivalent mechanisms for Web-based server applications.

The foregoing objects are achieved as is now described. A test page including a statement invoking an executable periodically reloading the test page is placed on a Web server having a security plug-in to be tested. The test page may include multiple frames, each containing a reference requesting access to the same test page or each performing a different testing function. The test page may be placed in a protected directory, may include an attempt to access the contents of a file within a different protected directory, and may include attempts to access protected CGI executables or other programs or modules which may be run on the Web server. A remote browser is employed to attempt to access the test page using the userid and password employed to login to the browser. Successful or unsuccessful access to the test page verifies proper operation of the security plug-in. The test page is automatically reloaded by the browser at a selected interval, and multiple frames or multiple browser instances each accessing the test page results in stress testing of the security plug-in.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a screen capture for a simple JavaScript test page in accordance with a preferred embodiment of the present invention;

DETAILED DESCRIPTION OF THE PREFERRED EMBODIMENT

Figure 1:
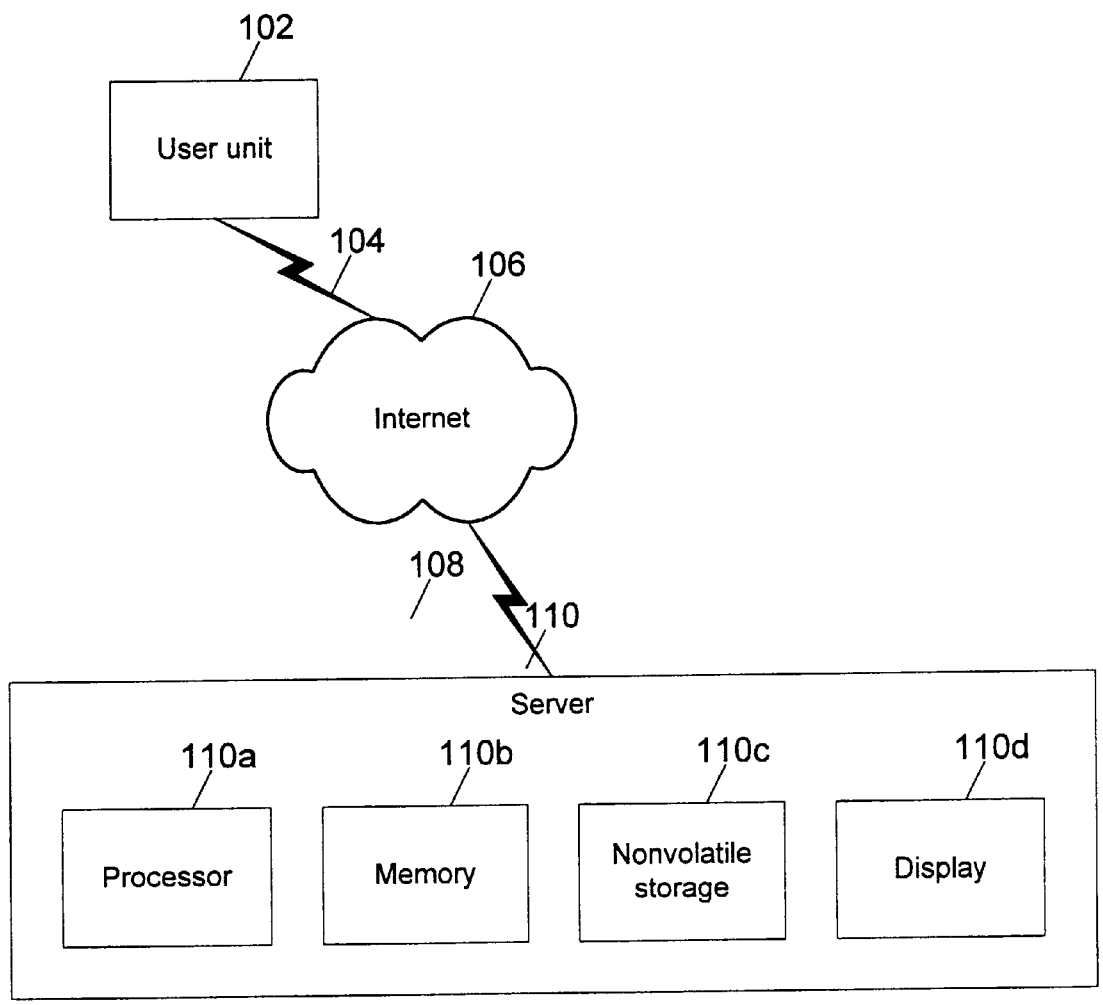
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. A workstation or user unit 102 is coupled via communications link 104 to the Internet 106, which is coupled in turn via communications link 108 to a server 110. User unit 102 includes a Web browser, employed to test a security plug-in within server 110, which is preferably a browser supporting JavaScript, such as Navigator or Communicator, available from Netscape Communications Corporation of Mountain View, Calif., or some versions of Internet Explorer, available from Microsoft Corporation of Redmond, Wash. Server 110, which includes a processor 110a, a memory 110b, nonvolatile storage 110c, and display 110d, also includes a Web server application capable of serving HyperText Transmission Protocol (HTTP) requests from the Web browser on user unit 102. The Web server application also includes a security plug-in to be tested and a test page as described in further detail below.

The present invention employs a HyperText Markup Language (HTML) test page consisting of 1 to N frames, with each frame containing the same document or different documents, located in secure areas of the Web server 110. Using JavaScript, in the exemplary embodiment, each frame is set to force a reload of the document at different intervals, with the main document being also set to reload at a longer interval. Thus, the Web browser running on user unit 102 constantly reloads documents in each frame as well as the entire document.

Referring now to FIG. 2, a screen capture for a basic JavaScript test page in accordance with a preferred embodiment of the present invention is illustrated. Screen capture 202 illustrates use of JavaScript reloading in an HTML frame. The source code for the test page follows in Listing 1:

```
                        Listing 1
<HTML>
<!-- jtest.html -->
<SCRIPT LANGUAGE="JavaScript">
function reloadtest ( ) {
        location.reload(true) ;
}
</SCRIPT>
<TITLE>This is a reload testing page for DFS Web Secure
</TITLE>
<BODY onLoad="window.setTimeout ('reloadtest( ) ;', 5000) ;">
<font size=-1>
<p> This is a reload testing page for DFS Web Secure
<br>
<b>
<SCRIPT LANGUAGE="JavaScript">
timenow = new Date ( ) ;
document.writeln(timenow.toLocaleString( ) ) ;
document.writeln("<BR>") ;
document.writeln(location) ;
</SCRIPT>
</font>
</b>
</BODY>
</HTML>
```

With the test page and source code shown, after 5 seconds, the browser window calls the reloadtest function, which in turn calls the JavaScript reload method, forcing reload of the document from the source rather than from a browser cache. Passing the reload method a "true" value, a value indicating that the document should be reloaded, causes the browser to refetch the frame from the Web server.

The <SCRIPT> tag within the source code in Listing 1 causes the JavaScript-enabled Web browser to dynamically evaluate its contents. For the source code employed in the exemplary embodiment, the current time and the Uniform Resource Locator (URL) of the test page are displayed on the screen every time the file is loaded. Alternatively, the URL and time may be logged to an access tracking file. The time allows the tester to determine whether the test is still running.

After the testing technician's userid and password are authenticated to the Web server containing the test page and the browser accesses the test page file, the Web browser will automatically reload the page—every 5 seconds in the exemplary embodiment, although other embodiments may be configured differently. The testing technician may locate the test page file in protected or unprotected directories within the Web server to test access as either an authenticated or unauthenticated user.

Multiple instances of the Web browser may be started, in accordance with the known art, from the same workstation or from different workstations. One Web browser could access the file as one user while another Web browser, possibly on the same workstation, could access the file as a different user. Running multiple browsers with automatic reloading stresses the Web server and tests access to the file. Should access fail, the browser will display the unauthorized access/error message and stop reloading the page. The test may be scaled by starting N Web browsers or by creating multiple HTML frames.

Figure 3:
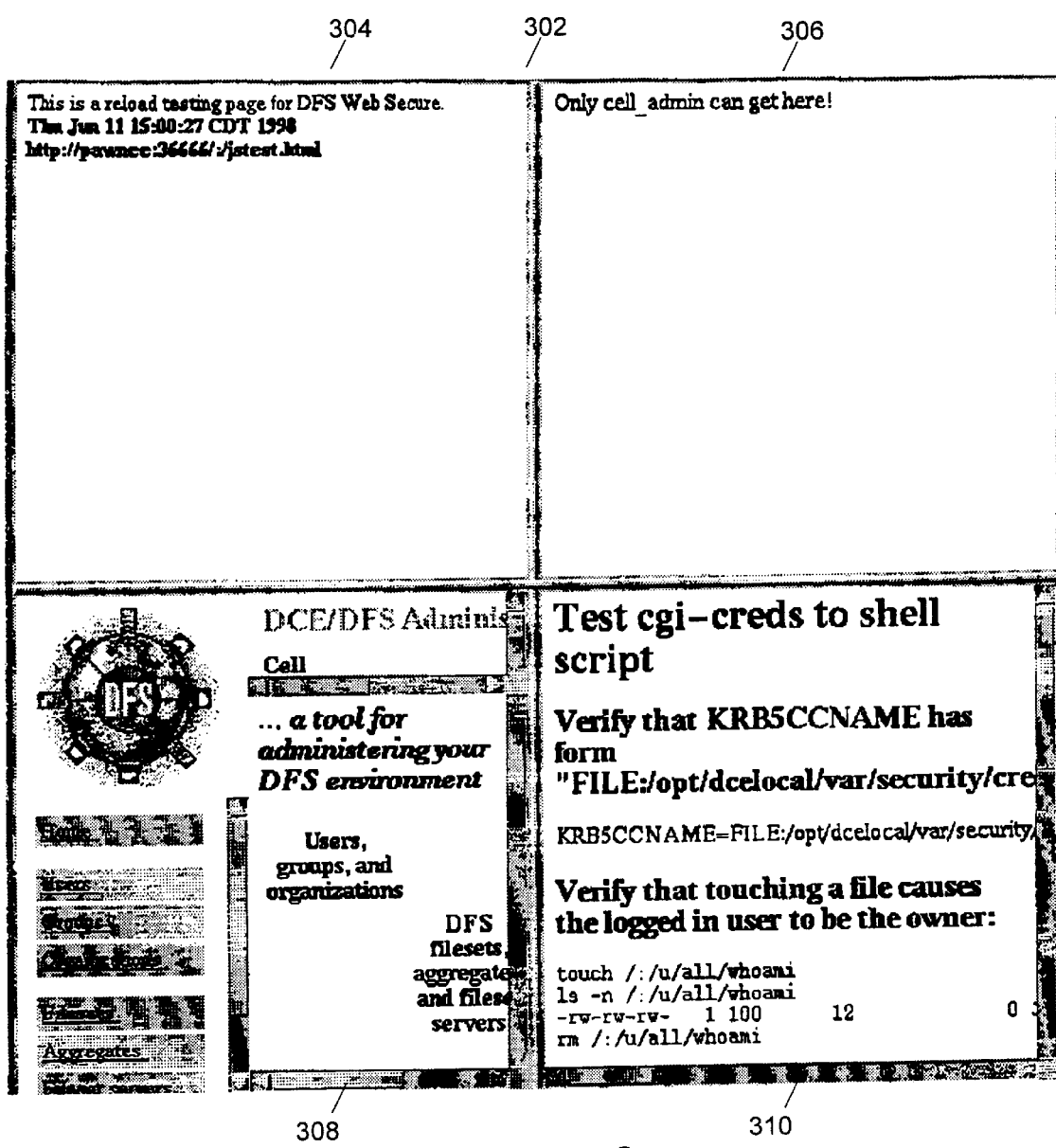
FIG. 3 depicts a screen capture for a JavaScript test page having multiple frames and multiple functions in accordance with a preferred embodiment of the present invention.

With reference now to FIG. 3, a screen capture for a JavaScript test page having multiple frames and multiple functions in accordance with a preferred embodiment of the present invention is depicted. Screen capture 302 illustrates use of JavaScript reloading in an HTML frame. The source code for the test page follows in Listing 2:

```
                        Listing 2
<HTML>
<!-- jtest.html -->
<SCRIPT LANGUAGE="JavaScript">
function reloadtest( ) {
        location.reload(true) ;
}
</SCRIPT>
<frameset cols="50%,*" rows='50%,*"
onLoad="window.setTimeout('reloadtest( ) ;',11000) ;">
<frame src="jstest.html">
<frame src="/:/cell_admin.only/index.html">
<frame src="/dceweb/cgi-bin/wdgrcgi?Action=DceWeb">
<frame src="/:/dfscgi-bin/testenv.cgi">
</frameset>
<noframe>
<p>Run <a href="jstest.html">jstest.html</a> for the non-
frame version of reload testing.
</noframe>
</HTML>
```

In this example, the test page creates four frames each testing a different aspect of the security plug-in.

The security plug-in is configured into a Web server on a system which preferably also has DCE and DFS clients installed. (The DFS client is optional required only for DFS access). When a user or administrator attempts to access a protected DCE CGI or DFS document on the Web server, the security plug-in will prompt the user for a DCE userid and password, if the Web transaction does not already have those values. Once a valid userid and password value pair are received, the security plug-in will map a DCE credential with the Web transaction and use the credential to gain access, if appropriate, to protected functions and files. The test page defined by the source code in Listing 2 helps test different aspects of the security plug-in. Of course, the invention is not limited to DCE or to any particular security mechanism, but may be adapted and/or applied to other situations.

In FIG. 3, frame 304 in the upper left corner of screen capture 302 displays the test page ("jstest.html") for the source code set forth in Listing 1, which reloads itself at periodic intervals smaller than the interval at which the entire test page from Listing 2 reloads. In the exemplary embodiment, jstest.html reloads every five seconds while "jsftest.html" (the source code in Listing 2) reloads every eleven seconds. Frame 304 tests unauthenticated access to a document in DFS space by loading an unprotected DFS document from the DFS root directory (/:).

Frame 306 in the upper right corner of screen capture 302 displays the contents of the index.html file in a protected DFS directory,/:/cell_admin.only. In the exemplary embodiment, the file is only accessible by the DCE cell_admin user and contains the text "Only cell_admin can get here!" The testing technician may retrieve this document by logging in as the DCE cell_admin before loading the test page for screen capture 302. If the testing technician had logged in with a different userid, frame 306 would show an HTTP 403 forbidden error. Thus, frame 306 tests access to files in protected directories by attempting to access a protected DFS document or directory.

Frame 308 in the bottom left corner of screen capture 302 displays a compacted version of the DCE Administration interface. The DCE Administration interface is a CGI program which runs with the DCE credentials of a logged-in user. Having the DCE Administration interface visible in frame 308 demonstrates that the DCE Administration interface may be invoked with the respective DCE credentials. Thus, frame 308 tests access to restricted CGIs. The same technique may be employed for other programs or modules which may be run on a Web server, including Java servlets, which are run like CGI programs, and Java applets, which may be downloaded from a protected directory. Either may require authentication for access during the course of running.

Frame 310 in the bottom right corner of screen capture 302 runs a shell script CGI program, testenv.cgi, which extracts information about the DCE credentials associated with a logged-in user. This test demonstrates that generic, non-DCE administrator CGIs may also extract the DCE credential associated with the Web transaction.

In the manner described above, the test page in Listing 2 tests four functions simultaneously, reloading all frames every 11 seconds:
(1) Unauthorized access;
(2) Authenticated access;
(3) Authenticated Administration GUI access; and
(4) Authenticated Script CGI access.

Although the exemplary embodiment is specific to a particular security plug-in, the invention may be applied to any Web-based administration interface which requires authentication via HTTP authentication, HTTP cookies, or other authentication schemes integrated with the Web server or HTTP protocol. The reload time and types of test may be varied to suit testing of a particular security plug-in. Testing may be limited to a simple security authentication mechanism or may be expanded to a frame-based interface for stressing the Web server. As illustrated above, the test page can be replicated to N frames or Web browser instances, each testing the same or a different aspect of the security to provide a stress test on the Web server. Immediate visual verification is provided to the testing technician. Errors are also logged by the Web server in the Web server's error or access log file.

Figure 4:
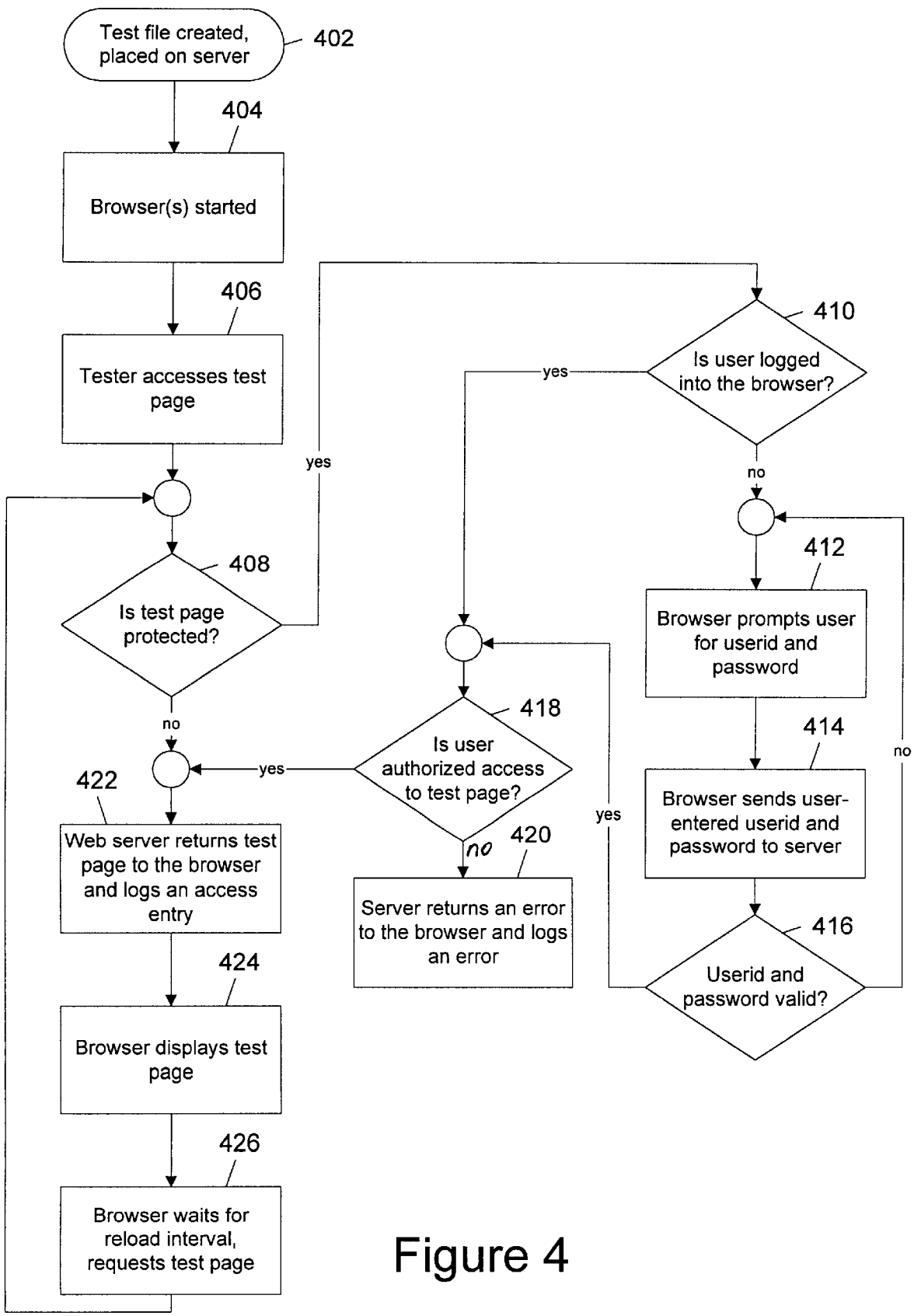
FIG. 4 is a high level flowchart for a process of employing a test page to test a security plug-in for a Web-based product in accordance with a preferred embodiment of the present invention.

Referring now to FIG. 4, a high level flowchart for a process of employing a test page to test a security plug-in for a Web-based product in accordance with a preferred embodiment of the present invention is illustrated. The process begins at step 402, which depicts creation of the JavaScript test file and placement on the Web server or file system to be tested with the required authentication criteria. The present invention need not be employed solely to test authentication mechanisms for access to a particular server, but may also be employed to test file system authentication mechanisms, such as a security module for DFS, which are not required to provide security to the Web server generally but only to the directories containing a portion of the distributed file system.

The process next passes to step 404, which illustrates starting a browser on a remote workstation system connected to the Web server containing the test page. The browser need not be a browser program, such as Navigator or Internet Explorer, but may also be any client program which supports the HTTP protocol and, in the case of the exemplary embodiment, JavaScript. Browsers may be started at multiple workstations, or multiple instances of the browser started at a single workstation, at this portion of the process. The process then passes to step 406, which depicts attempting to access the test page using the browser.

The process passes next to step 408, which illustrates the Web server receiving the request and making a determination of whether the test page is protected, such as by being in a protected file or within a protected directory. If so, the process proceeds to step 410, which depicts a determination of whether the testing technician has logged into the Web browser being employed to attempt access to the test page. If not the process proceeds to step 412, which illustrates the Web server prompting the user for a userid and password, either by sending back an HTTP 401 unauthorized return code or by sending back an HTTP form requesting the userid and password.

The process then passes to step 414, which depicts the Web server receiving a userid and password, user-entered in the exemplary embodiment but possibly included in a script file, and next to step 416, which illustrates a determination of whether the userid and password are valid. If not, the process returns to step 412, and the Web server again prompts the testing technician for a userid and password. If a valid userid and password are received, or, referring back to step 410, if the user was previously logged into the Web browser with a valid userid and password, the process proceeds instead to step 418, which depicts a determination, based on the userid and password entered by the testing technician, of whether the testing technician is authorized to access the test page. If not, the process proceeds to step 420, which illustrates the Web server passing back a HTTP 403 forbidden access error code to the Web browser and logging the error.

If the userid and password employed by the testing technician is authorized access to a protected test page, or, referring back to step 408, if the test page is not protected, the process then proceeds to step 422, which depicts the Web server sending back the contents of the test page to the Web browser and logging an access entry for the successful transaction. The process passes next to step 424, which illustrates the Web browser receiving and displaying the test page for visual verification that the security mechanism operated properly, and then to step 426, which depicts the Web browser waiting until the reload interval specified within the test page elapses, then requesting the test page and returning to step 408. The process thus runs until an error condition occurs or until interrupted by an external process. Once successfully accessed, an error condition in accessing the test page within the loop portion of the process may indicate a problem in authentication where none should exist under normal conditions.

The test of a security plug-in in accordance with the present invention may be run for several hours, with the testing technician periodically checking the contents of various frames to verify progress. If the test page or protected documents or CGIs referenced in the test page are accessed with a userid and password which should not be permitted to load the protected page, documents, or executables, the testing technician can detect that a problem exists in the authentication scheme and determine whether the Web server, the authentication plug-in, or supporting processes are at fault. The same is true if access which should be permitted by the security plug-in is not allowed.

The present invention may be employed to direct a constant stream of HTTP requests to a Web server which will not be satisfied from a Web browser's cache, and may do so within an SSL environment set up by the Web server. This allows testing to occur where users are more likely to employ a Web server-based authentication product, through a Web browser. The testing architecture disclosed as the exemplary embodiment may be run on all Netscape browsers having JavaScript support and on versions of Microsoft Internet Explorer which have JScript support. Although illustrated using JavaScript, the present invention may also be implemented using Java or any other suitable client program which may be integrated into a test page. In JavaScript or Java, the test architecture of the present invention is platform independent. Both the authentication mechanism and the protection of documents, CGIs, and Java applets or servlets may be tested using the present invention, and the invention is open to all Web server-based authentication, not just DCE.

It is important to note that while the present invention has been described in the context of a fully functional data processing system, network, and/or system of networks, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of testing plug-ins for a Web-based product, comprising:

creating a test page including a statement invoking an executable periodically reloading the test page;

placing the test page on a server having a security mechanism to be tested; and attempting to access the test page from a remote browser connected to the server, wherein successful or unsuccessful access of the test page verifies proper operation of the security mechanism.

2. The method of claim 1, wherein the step of creating a test page including a statement invoking an executable periodically reloading the test page further comprises:

creating a test page including a JavaScript script invoking a reload function.

3. The method of claim 1, wherein the step of creating a test page including a statement invoking an executable periodically reloading the test page further comprises:

creating a test page including a request for a protected document.

4. The method of claim 1, wherein the step of creating a test page including a statement invoking an executable periodically reloading the test page further comprises:

creating a test page including a request for a protected executable.

5. The method of claim 1, wherein the step of placing the test page on a server having a security mechanism to be tested further comprises:

placing the test page in a protected directory.

6. The method of claim 1, wherein the step of attempting to access the test page from a remote browser connected to the server further comprises:

requesting the test page with a userid and password not authorized to access the test page.

7. The method of claim 1, wherein the step of attempting to access the test page from a remote browser connected to the server further comprises:

attempting to access the test page concurrently from a plurality of browsers or workstations.

8. The method of claim 1, wherein the step of attempting to access the test page from a remote browser connected to the server further comprises:

periodically requesting the test page at a reload interval specified by the test page.

9. A mechanism for of testing plug-ins for a Web-based product, comprising:

a server including a security mechanism to be tested and a test page including a statement invoking an executable periodically reloading the test page; and a workstation connected to the server and running a browser attempting to access the test page, wherein successful or unsuccessful access of the test page verifies proper operation of the security mechanism.

10. The mechanism of claim 9, wherein the server further comprises a protected directory containing the test page.

11. The mechanism of claim 9, wherein the test page further comprises a reference to a protected document.

12. The mechanism of claim 9, wherein the test page further comprises a reference to a protected executable.

13. The mechanism of claim 9, wherein the test page further comprises a plurality of frames each testing a different feature of the security mechanism.

14. The mechanism of claim 9, wherein the browser repeatedly requests the test page at a reload interval specified in the test page.

15. The mechanism of claim 9, wherein the test page includes a JavaScript script calling a reload function.

16. A computer program product within a computer usable medium, comprising:

a test page including a statement invoking an executable periodically reloading the test page;

instructions for determining whether a userid and password submitted with a browser request for the test page are authorized to access the test page;

instructions, responsive to determining that the userid and password are not authorized to access the test page, for returning an error code;

instructions, responsive to determining that the userid and password are authorized to access the test page, for returning the contents of the test page to a browser submitting the browser request; and instructions for displaying the error code or the contents of the test page.

17. The computer program product of claim 16, further comprising:

instructions within the test page for requesting reload of the test page at a periodic interval.

18. The computer program product of claim 16, further comprising:

instructions within the test page for requesting a protected document.

19. The computer program product of claim 16, further comprising:

instructions within the test page for requesting a protected executable.

20. The computer program product of claim 16, wherein the test page further comprises a JavaScript script.

* * * * *